United States Patent
Holmes

(10) Patent No.: US 7,195,416 B2
(45) Date of Patent: Mar. 27, 2007

(54) BALL-AND-SOCKET JOINT AND BALL-AND-SOCKET BEARING SHELL

(75) Inventor: Eric Holmes, Ann Arbor, MI (US)

(73) Assignee: ZF Lemförder Metallwaren AG (DE)

(*) Notice: Subject to any disclaimer, the term of this patent is extended or adjusted under 35 U.S.C. 154(b) by 0 days.

(21) Appl. No.: 10/664,703

(22) Filed: Sep. 18, 2003

(65) Prior Publication Data
US 2005/0063769 A1  Mar. 24, 2005

(51) Int. Cl.
*F16C 11/00* (2006.01)
(52) U.S. Cl. .................. 403/133; 403/135; 403/122
(58) Field of Classification Search ............. 403/122, 403/133–135, 141–143
See application file for complete search history.

(56) References Cited

U.S. PATENT DOCUMENTS 5,044,811 A * 9/1991 Suzuki et al. ............... 403/134
5,489,161 A * 2/1996 Sugita et al. ............... 403/134
5,611,635 A * 3/1997 Schutt et al. ............... 403/141
5,676,485 A * 10/1997 Lee ............................ 403/135
6,736,565 B2 * 5/2004 Tamatsu et al. ............ 403/122

FOREIGN PATENT DOCUMENTS

DE    296 16 350    10/1997
WO    WO 97/41361   11/1997

* cited by examiner

*Primary Examiner*—Daniel P. Stodola
*Assistant Examiner*—Michael P. Ferguson
(74) *Attorney, Agent, or Firm*—McGlew & Tuttle, PC

(57) ABSTRACT

A ball-and-socket joint for motor vehicles provided, with a joint ball and a pivot pin, a housing part formed of a shaped metal tube having a top end with an opening and having an opposite end with a pivot pin opening through which the pivot pin protrudes and with a molded material molded on a portion of the housing, the molded on material forming functional surfaces on each of an inside and an outside of the housing part.

27 Claims, 19 Drawing Sheets

BALL-AND-SOCKET JOINT AND BALL-AND-SOCKET BEARING SHELL

FIELD OF THE INVENTION

The present invention pertains to a ball-and-socket joint, preferably for motor vehicles, in which a joint ball formed on a pivot pin is mounted movably in a bearing shell consisting of a plastic or other similar material and the bearing shell is surrounded with a housing which provides support to the assembly. The invention also pertains to a process for forming a ball-and-socket joint.

BACKGROUND OF THE INVENTION

Such ball-and-socket joints of this type are widely used in mechanical engineering, especially in the automotive industry. Ball and socket joints are often made of a housing part that is generally tubular or cup shaped and includes a bearing shell (race insert) that is positioned within the housing part. Additionally, an end plate is sometimes used to close one end of the structure and a bellows (boot) is used connected to the bearing pin and to the housing at the other end. Other structural parts are provided for sealing connections. These include a boot seal or bellows seal structure that provides a seat for the bellows and provides a sealing function. Some ball and socket joints also include further sealing structures cooperating with the bearing shell or otherwise provided to maintain protection in the region of the ball joint.

A ball-and-socket is known from DE 296 07 587.6 & DE 296 16 350.3. Such ball-and-socket joint has a ball surrounded by a bearing shell which is molded-in-place or cast in place. To create the joint, a joint housing is held fixed in place and a ball portion of a bearing pin is located within the joint housing with the bearing pin being fixedly held in place to maintain location of the ball portion within the joint housing. A material is then molded-in-place (such as by injection molding) or cast in place between the joint housing and ball portion thus forming the bearing shell.

Prior art constructions have proven quite effective in use. However, most designs require significant numbers of manufacturing steps and some sophisticated designs are quite labor-intensive with regard to manufacturing.

SUMMARY OF THE INVENTION

It is an object of the invention to provide a ball-and-socket joint that may be manufactured economically with few steps and is simple in design and rugged in construction. According to the invention to a ball-and-socket joint for motor vehicles or similar applications has a joint ball incorporated as part of a pivot pin. The pivot pin is commonly used as a mounting for the ball-and-socket joint to a control arm or other component of a motor vehicle. A joint ball resides within the ball-and-socket joint and acts as the point around which the ball-and-socket joint allows articulation. A housing is formed of a shaped metal tube. The housing has a top end with an opening and an end, opposite to the top end, with an opening through which the pivot pin protrudes for connection with the vehicle component. A material molded directly on the housing is used to form a functional surface or surfaces on the inside of the housing where the functional surface serves as a bearing shell for the joint ball, and or on the outer surface of the housing where the molded material can serve as a mounting for a bellows, or other type of sealing element.

The molded material forming the inner and outer functional surfaces can be continuous and follow around an edge of the housing as it transitions from one surface to another. Molded in ties can be formed in the molded material, these ties passing through openings or holes in the housing part, thus connecting the inner and outer functional surfaces, positively locking them in relation to the housing part. The bearing shell surface can likewise form a bearing surface for the joint ball which is a contact surface in contact with effectively the entire usable bearing surface of the joint ball.

Extension segments (petals) of the molded material can be formed, integral with the molded material and extending from a region of the bearing shell portion of the molded material. The petals utilize an integral hinge or flexible section so they may be folded about the joint ball after the joint ball is inserted into the bearing shell portion of the molded part. The petals, after being folded over, form a remainder of the bearing shell surface in functional contact with the joint ball. The petals are molded with a concave shape on their inner surface so as to correspond to the shape of the joint ball to which they will interface. Often the joint ball will contact the bearing shell and petal surfaces in less than the entire usable joint ball bearing surface.

As an alternative to the petals being folded into functional contact with the joint ball, a bearing shell insert can be inserted in the housing adjacent to the molded bearing shell portion. The bearing shell insert may have a bearing surface which cooperates with the molded part to form an adequate bearing interface surface for the joint ball to bear on.

As a further alternative, the molded part forming part of or the entire bearing surface can be molded outside the housing and then inserted with, or inserted before, the joint ball into the housing.

An end cap may be used to close the opening in the housing top end after insertion of the molded bearing shell and any other bearing shell forming parts, along with the joint ball/pivot pin, into the housing. The end cap is held in place in the opening by a rolling over lip which is rolled over or pressed onto the perimeter of the end cap to retain the end cap in place, thus closing the opening. The end cap can also provide a pre-load on the molded part (bearing shell) against the joint ball to achieve a desired force requirement for movement of the joint ball relative to the bearing shell in rotation and pivoting alike. The folded area can be pressed or crimped onto a lip incorporated into the molded part to lock the molded part to the housing after molding in place or insertion of the molded part.

Ribs or other surface texturing features such as knurling can be incorporated into the inner surface of the housing part. The ribs are located in the areas where the molded part is either molded to the housing, or where the molded part, if pre-molded outside the housing, is to come into contact with the housing part. The ribs form an interference fit with the molded part, biting into the molded part and thus preventing a rotation of the molded part relative to the housing as the ball-and-socket joint is used. Ribs may also be used on the outside of the housing part to form an interference fit with the component into which the joint is being mounted. This interference fit prevents a rotation of the housing relative to the component into which it is mounted.

Manufacturing of the ball-and-socket joint can be performed starting with a tube which is rolled, spun or hydroformed etc. into a profiled tube comprised of repeated formed sections of housing parts. These sections are then cut to form individual housing parts. In comparison to traditional forming methods, which can also be used to manufacture the housing parts, the cutting of the individual housing parts from the profiled tube avoids the waste associated with flange areas of traditional stamping processes.

The individual housing part is then placed in a mold space or fixture where material is injection molded, or otherwise molded, or cast, into the space provided in the mold between an inner mold contour and outer mold support elements onto surfaces of the housing part. The resulting part molded onto the housing part has the functional surfaces incorporated therein to interact with the joint ball as the bearing surface upon which the joint ball acts. A boot groove for the retention of a sealing bellows may be incorporated into the molded part in addition to the joint ball surface and any other functional surfaces of the molded part. The molded part may wrap around the lip of the housing part as it transitions from one functional surface to the next. Holes or openings in the housing part may be incorporated. The holes provide a pass through for the molded material to join during molding from the outside of the housing part to the inside of the housing part thus forming ties. The ties help to affix the inner and outer functional surfaces of the molded part to each other, to resist separation from the housing part, and to prevent a rotation of the molded part relative to the housing part.

The molded part may also be molded as a component separate from the housing part, and then inserted into the housing part either prior to or in conjunction with the insertion of the joint ball. A second molded part can also be used to provide functional surface area for the joint ball where the molded part does not provide the entire bearing area needed for the joint ball.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
FIG. 1 is a perspective view of tubing used in a process according to one embodiment of the process of the invention.
Figure 2:
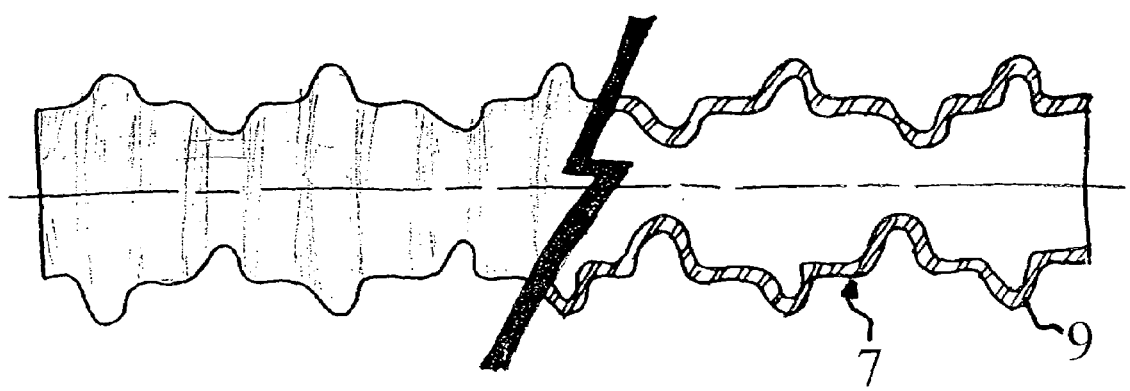
FIG. 2 is a partial sectional view of the tube of FIG. 1 after a stamping or other shaping procedure.
Figure 3:
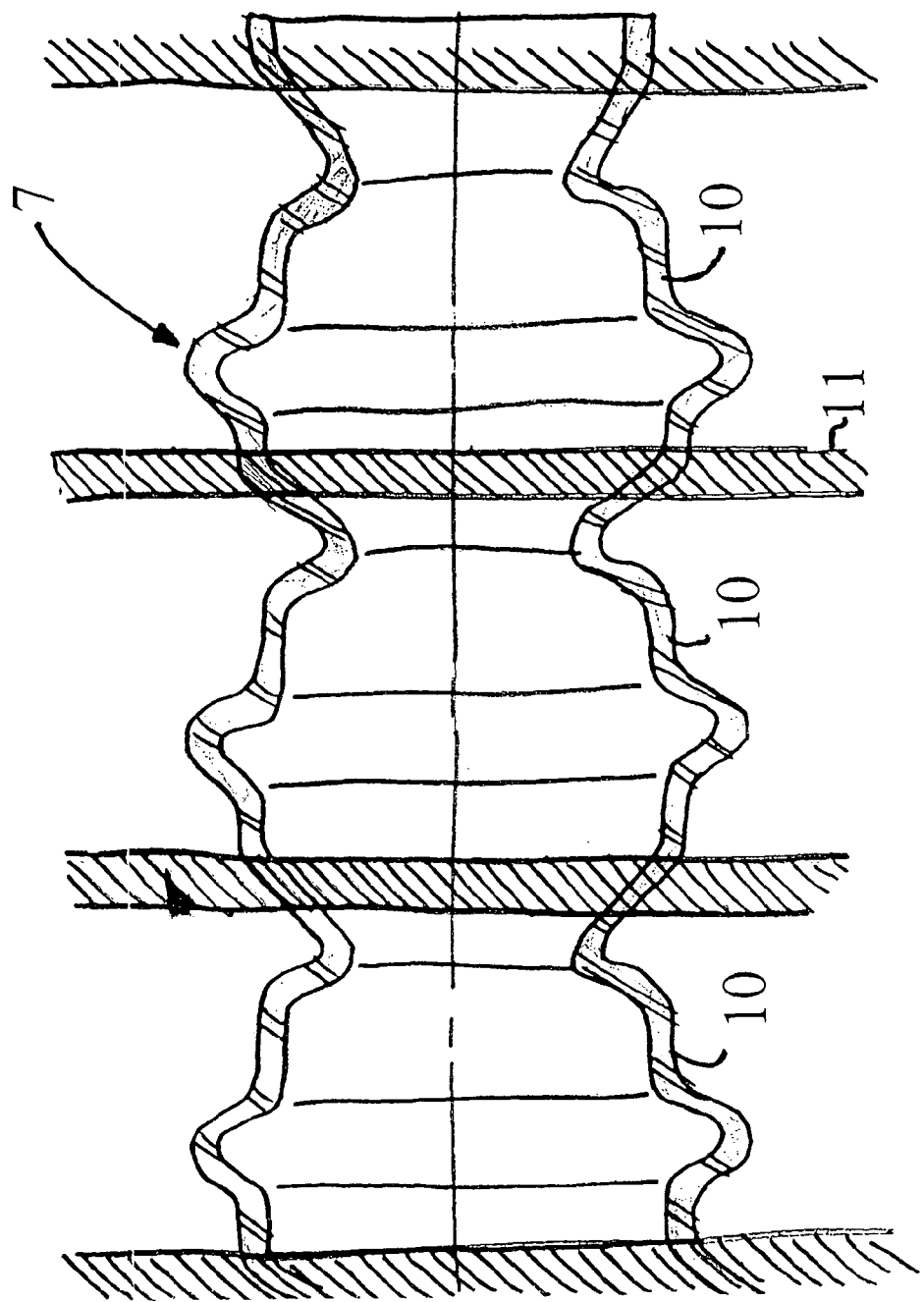
FIG. 3 is a sectional view showing the machined tube of FIG. 2, indicating locations for cutting.

Referring to the drawings in particular, FIG. 1 shows tubing 5 that can be used according to a process for forming a ball and socket joint according to the invention. The tubing 5 is shaped in a shaping process to produce a shaped tube generally designated 7 (FIG. 2). The shaping process of the tube may utilize techniques such as hydroforming, rolling, etc. The shaped tubing 7 includes contours such as contour 9 forming the base for a bellows support groove. As illustrated in FIG. 3 the shaped tube 7 is cut at cutlines 11 to form several housing parts 10 of a desired length. The cutting of the tube may also be done in such a manner that a section of scrap material between the housing parts 10 is removed. This section of scrap material may be utilized to absorb excess runout material resulting from the forming process for the housing parts 10 and to allow for tolerances in the manufacturing process. As an alternative to forming a shaped tube which is subsequently cut into individual housing parts 10, the housing parts 10 may be formed individually by numerous metal forming processes known in the art.

Figure 4:
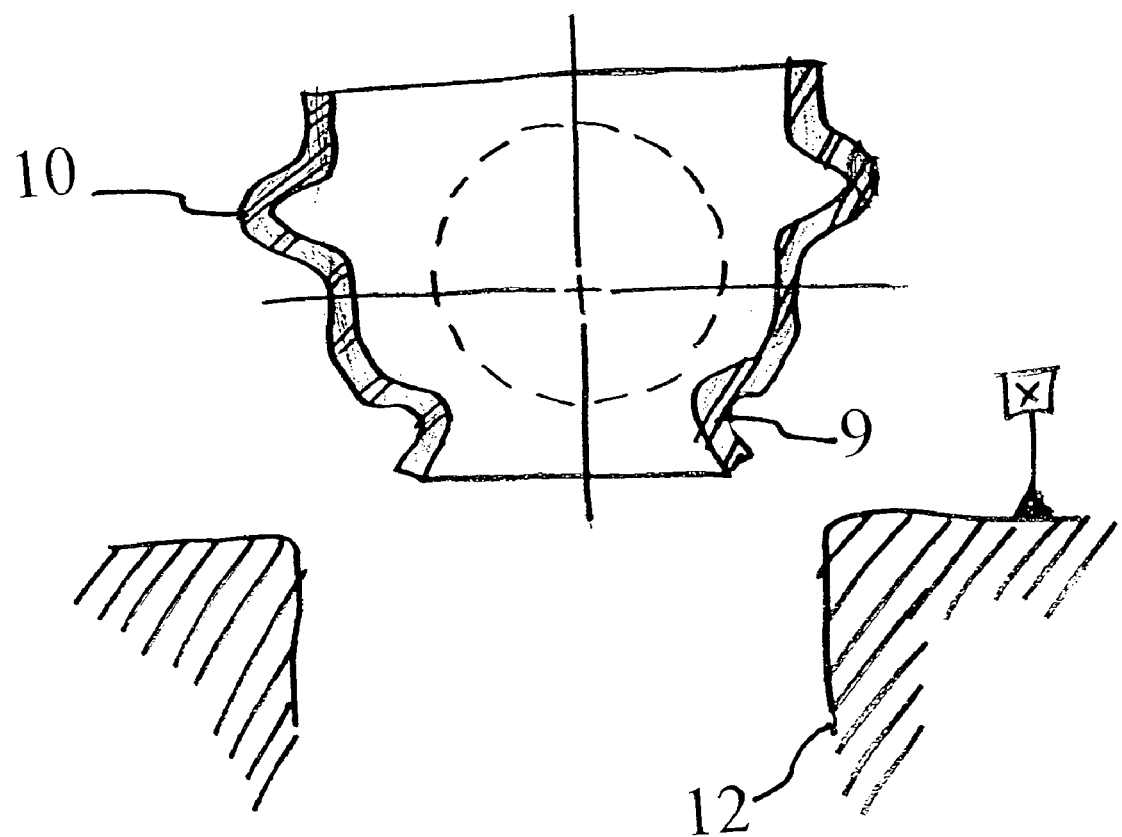
FIG. 4 is a sectional view showing a further shaping procedure for a housing part of the ball and socket joint according to the invention.
Figure 5:
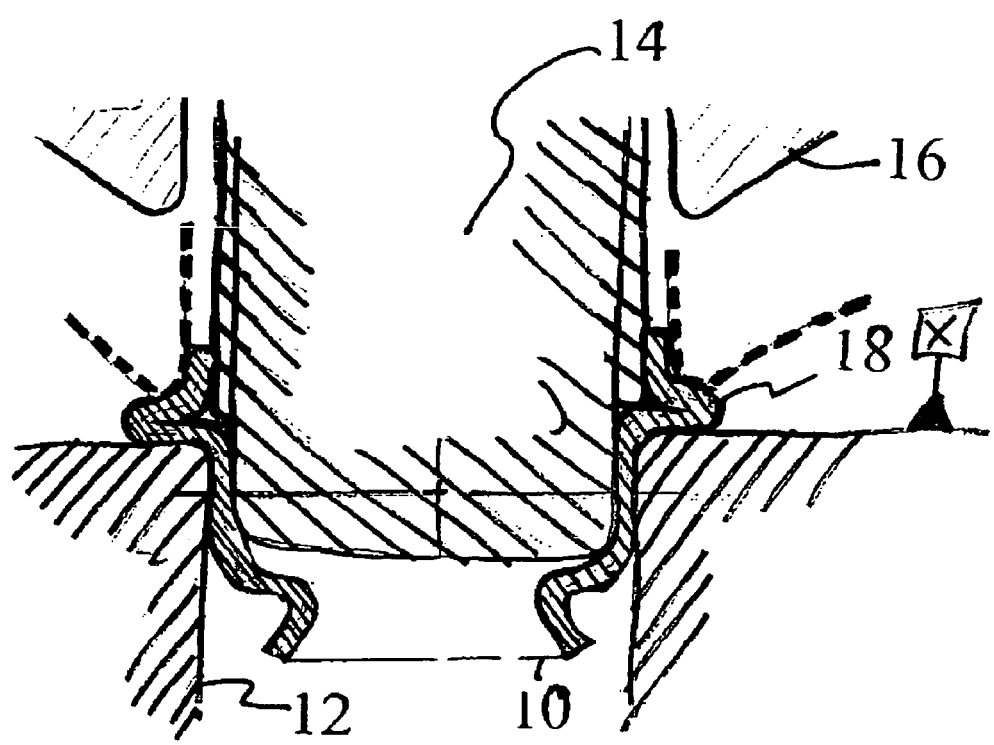
FIG. 5 is an illustration of further shaping procedure according to an embodiment of the process of the invention.
Figure 6:
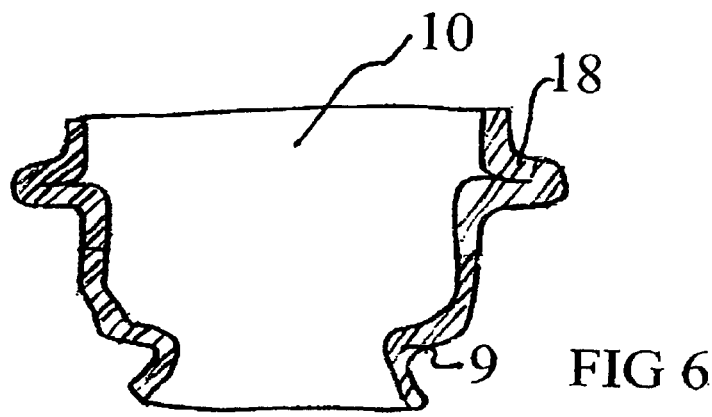
FIG. 6 is a sectional view of a housing part for the ball and socket joint according to the invention.

To provide a further shaping to the housing part 10, the housing part 10 is subjected to a stamping procedure or other shaping procedure as illustrated in FIGS. 4 and 5. The support 12 is provided and optionally an interior support 14 is also provided to support the housing 10. The supports 12 and 14 interact with a press 16. This results in a stamped flange contour 18 as can be seen in FIG. 6. As shown in FIG. 5, the interior support sets the press fit diameter and corner radius of the interior of the housing part 10, while the support 12 supports the outside diameter of the housing part and the flange contour 18. The housing part 10 may optionally be cleaned after forming to remove greases, oils, and any other contaminants which may adversely affect subsequent manufacturing process, in particular the adhesion of molding or coating materials to the housing part 10.

Figure 7:
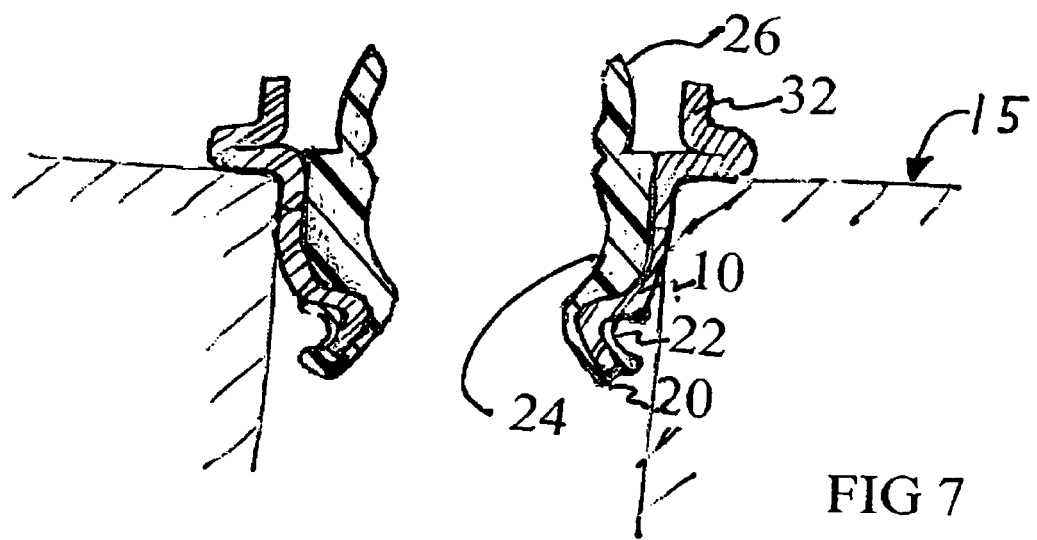
FIG. 7 is a sectional view showing a molding procedure with surface portions molded upon the housing part.
Figure 13:
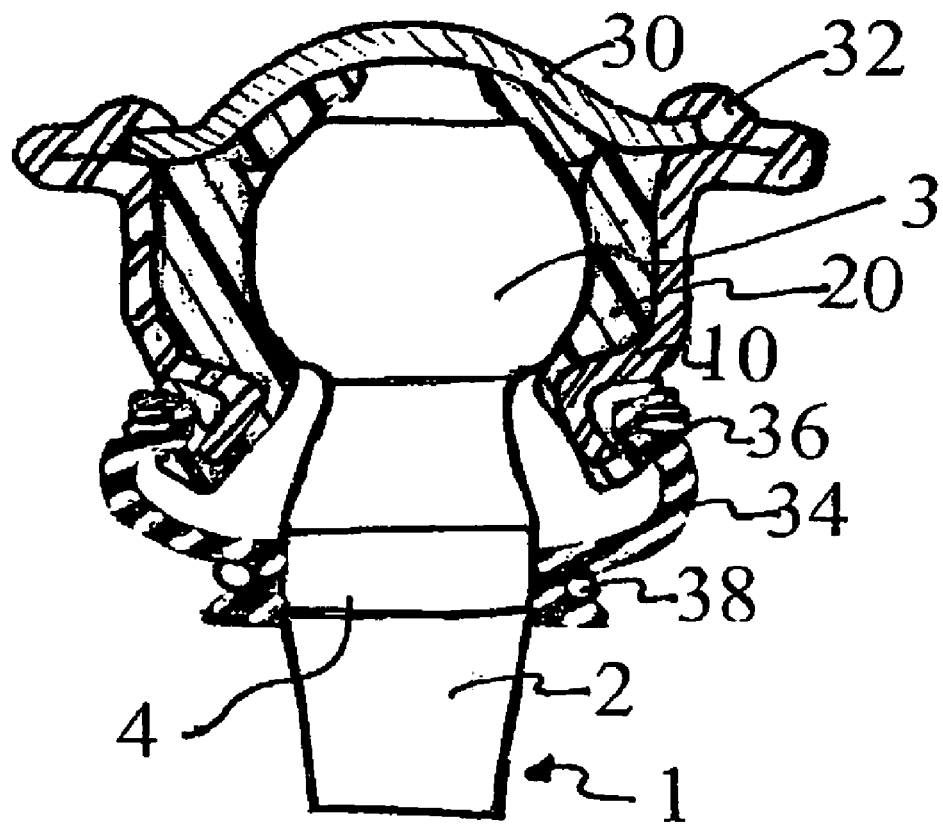
FIG. 13 is a sectional view of the final assembled ball and socket joint according to the embodiment FIG. 8A.

The housing part 10 is disposed at least partially in a mold 15 as shown in FIG. 7. The mold 15 has support surfaces for supporting the housing part. The support surfaces may include a support or supports of the exterior of the housing 10 which are not to receive a molded part. This supports the housing part 10 in the mold relative to the mold space. Injectable material is then injected into the mold space to form a molded part 20 with functional surfaces formed by injection molded material. As an alternative to injection molding of material to form part 20, casting, compression molding or other methods known in the art may be utilized to form the molded part 20. The functional surfaces of the molded part 20 include a race surface or bearing surface 24 for the ball 3 as well as a sealing boot groove or bellows seal seat 22. The functional surfaces also may include functional surfaces formed for interaction with the pivot pin 2 and with a top of the ball 3 as shown in FIG. 13. In the embodiment of FIG. 13 (see also FIG. 8A and the molding step of FIG. 7) the bearing surfaces for interaction with the top of the ball 3 are provided by integrally formed petals or segments 26. Other functional surfaces may be provided including surfaces for lubricant sealing at the race or near the pivot pin 2 of the ball pivot 1.

Figure 8B:
FIG. 8B is an perspective view of the molded part according to the embodiment of FIG. 8A.
Figure 8A:
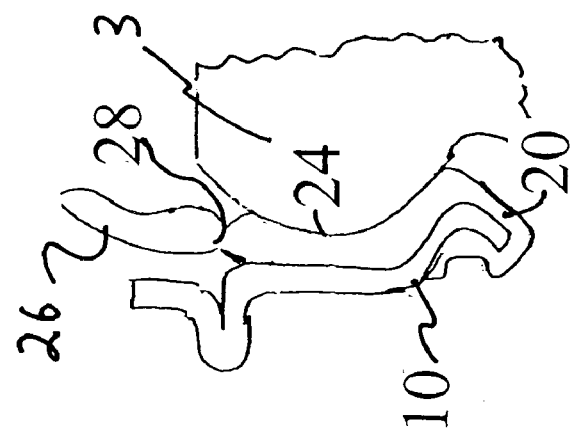
FIG. 8A is a sectional view showing the particulars of the molded portion according to an embodiment of the invention.

FIG. 8A depicts the ball 3 seated in the bearing surface 24 of the molded part 20 from the molding procedure of FIG. 7. The housing part 10 now has the molded part 20 molded onto it. The molded part includes a folded area 28 connecting the segments 26 to the remaining portion of the molded part 20. The segments 26 are fold at the folded area 28 to provide an upper bearing surface for the ball part 3 of the ball pivot 1.

FIG. 8B illustrates the feature of the segments 26 and illustrates the direction of folding of the segments 26 with respect to the folded area 28. The process including the molding procedure of FIG. 7 results in an integral unit that provides bearing surfaces at an upper portion, at a middle portion and at a lower portion of the ball pivot 3 (full bearing surface or race) as well as the boot groove or seat 22 for the upper portion of the bellows seal 34 as shown in FIG. 13.

Figure 10:
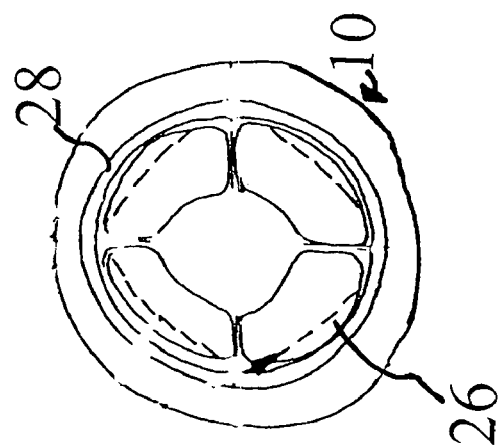
FIG. 10 is a top view of an alternative to the embodiment of FIG. 9.
Figure 9:
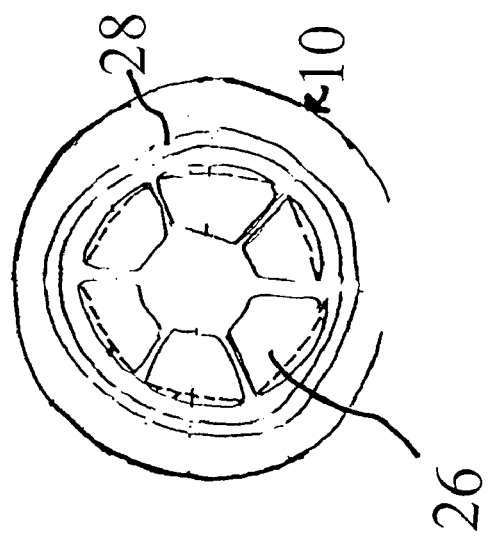
FIG. 9 is a top view of the embodiment FIG. 8A.

The segments 26 allow for a manufacturing process in which a single injection or otherwise molding step forms the various surfaces as noted above. The segments 26 may be provided in a convenient number such as the six segments 26 shown in FIG. 9 or the four segments 26 shown in FIG. 10. The exact number of the segments may be related to the diameter of the over all bearing which is available. The number of petals or segments 26 can also be related to the diameter of a rollover lip/edge 32 of the housing part 10 (see FIG. 11). The number of segments 26 may also be selected to optimize the overall ball and socket joint with regard to torques and elasticities.

Figure 12A:
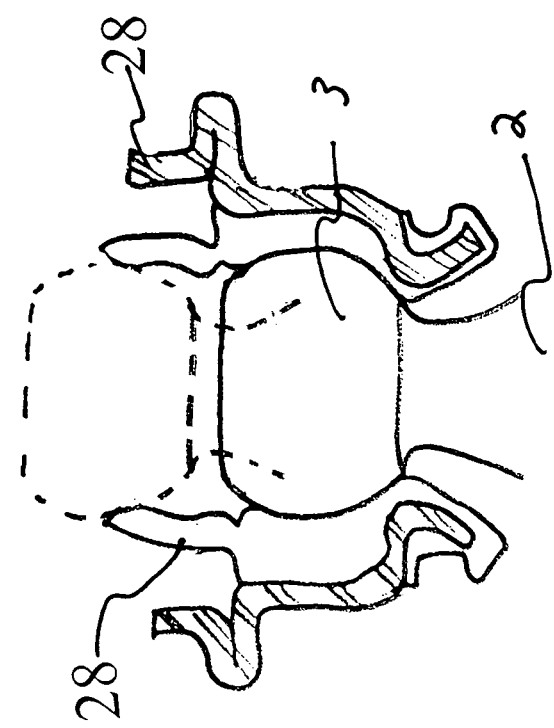
FIG. 12A is a sectional view illustrating a step in the manufacturing process for forming the ball and socket joint according to the embodiment of FIG. 8A.

The segments themselves are preferably slightly curved as shown in FIG. 8A relative to the remainder of the molded part 20. The folded area 28 may also include a curved section in the transition between the segment 28 and the remaining portion of the molded part 20. A slight curve to the structure results in segments being pulled down slightly as the ball is popped into the bearing surface 24. This is based on insertion of the ball 3 from the top as shown in FIG. 12A. Depending on the particular design, grease grooves may not be necessary in the molded part 20, thus allowing more of the bearing surface 24 to contact the ball 3, in turn providing greater wearing life for the joint.

Figure 11:
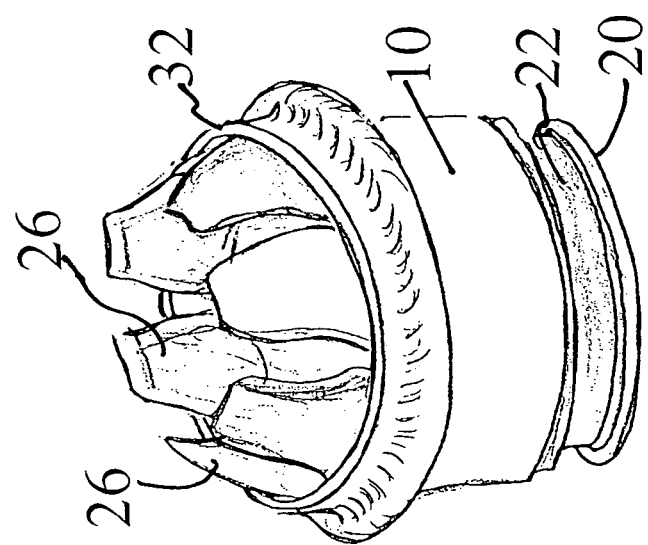
FIG. 11 is a perspective view of the embodiment of FIG. 8A showing a stage of the manufacturing process according to the invention.

FIG. 11 is a perspective view showing the housing part 10 with the molded part 20 molded thereto showing the bellows seat 22 as well as the segments 26. The rollover lip 32 is shown in a position ready to interact with an end cap 30 as shown in FIG. 12C.

Figure 12C:
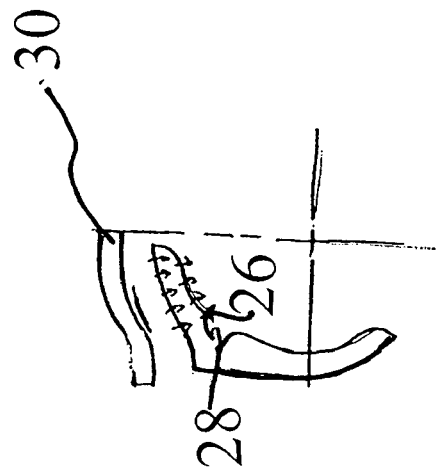
FIG. 12C is another sectional view illustrating another step in the manufacturing process for forming the ball and socket joint according to the embodiment of FIG. 8A.
Figure 12B:
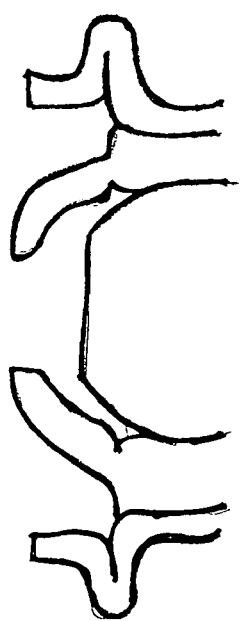
FIG. 12B is a sectional view illustrating another step in the manufacturing process for forming the ball and socket joint according to the embodiment FIG. 8A.

The closure of the housing with the end cap 30 after the insertion of the ball pivot 1 is illustrated in FIGS. 12A, 12B and 12C. As shown in FIG. 12A the ball pivot 1 is inserted into the assembly of FIG. 11 with the ball 3 urging the segments 26 into an open position. The segments 26 pivot or flex at the folded area 28 as the ball 3 is inserted into the interior of the housing 10. As the pivot pin 2 is extended through the housing and the ball 3 is popped into position the segments 26 are pulled somewhat into position as shown in FIG. 12B. This pulling of the segments 26 is based on the integral nature of the molded part 20 and is based on the shape of the segments 26 and folded area 28 as described above. As shown in FIG. 12C the end cap 30 pushes down upon the segments 26. The roll over portion 32 (as shown in FIG. 13) then rolls over the edge of the end cap 30. The roll over process may also be used to influence the torques and elasticities of the resulting construction based on the large influence of the end cap 30 pressing the segments 26. The torques and elasticities may be measured during the application of force on the end cap 30 until the desired range is reached and this range may be set by rolling over the edge 32 to freeze the joint at the selected values of torques and elasticities.

The shape of the segments 26, particularly the interior facing bearing surface, can be varied in order to optimize the wear of this bearing surface. It is also possible to vary the force applied to the end cap 30 to optimize the wear of the bearing surface 24 and the bearing surface of segments 26. During the procedure shown in FIGS. 12A–12C or prior to that, grease or another lubricant may be inserted into the region of the bearing surface 24. The bearing surface 24 may also have grooves, or other cavities, to hold grease.

An assembled ball and socket joint is shown in FIG. 13. A bellows or boot 34 is applied with a closure ring 38 to the pivot 2 of the ball pivot 1. The other end of the bellows 34 is connected to the boot or the bellows seat 22 via a holding ring 36. The rollover edge 32 can be an edge of the end cap 30 to provide a closure to the interior of the ball and socket joint.

Figure 14:
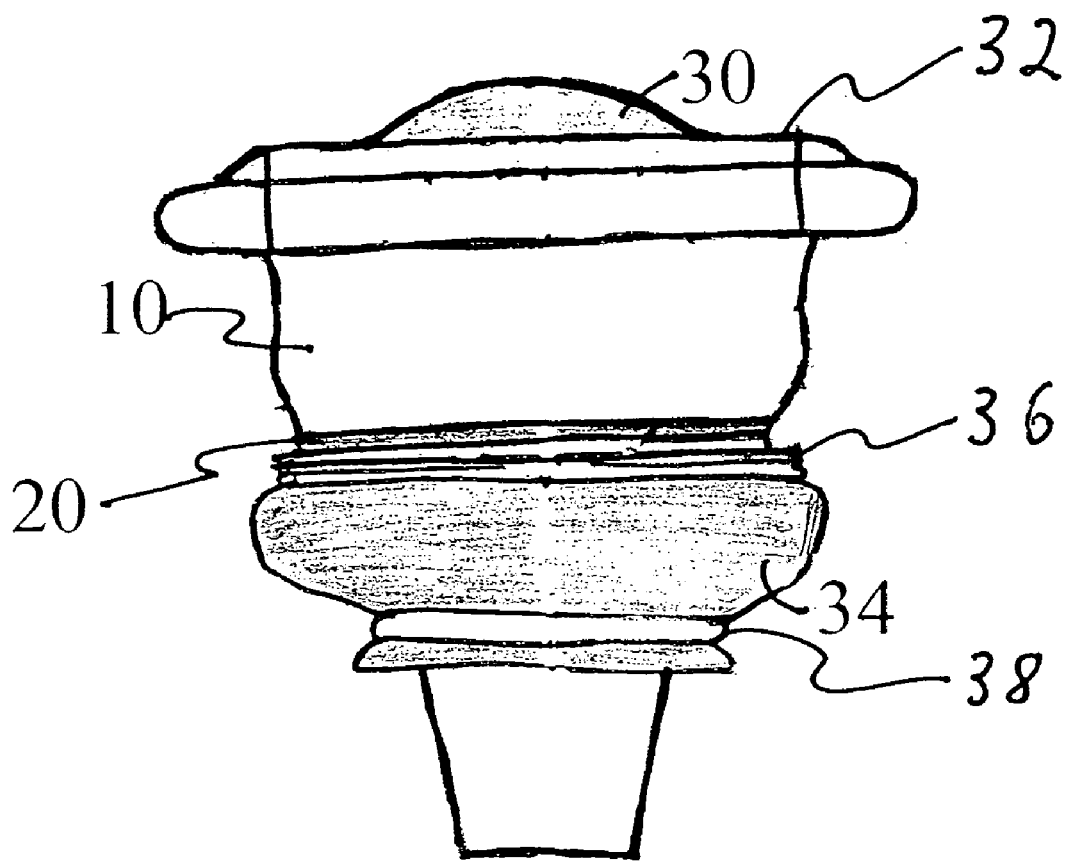
FIG. 14 is the exterior view of the assembled ball and socket joint according to the embodiment of FIG. 8A.

FIG. 14 shows the assembled ball and socket joint of FIG. 13 in a side view. FIG. 14 shows the bellows 34 as well as the ring 38 and ring 36. Additionally a small portion of the molded part 20 can be observed, namely the portion at the upper edge of the surface 22. The end cap 30 is shown closed off by the rollover edge 32.

Figure 15:
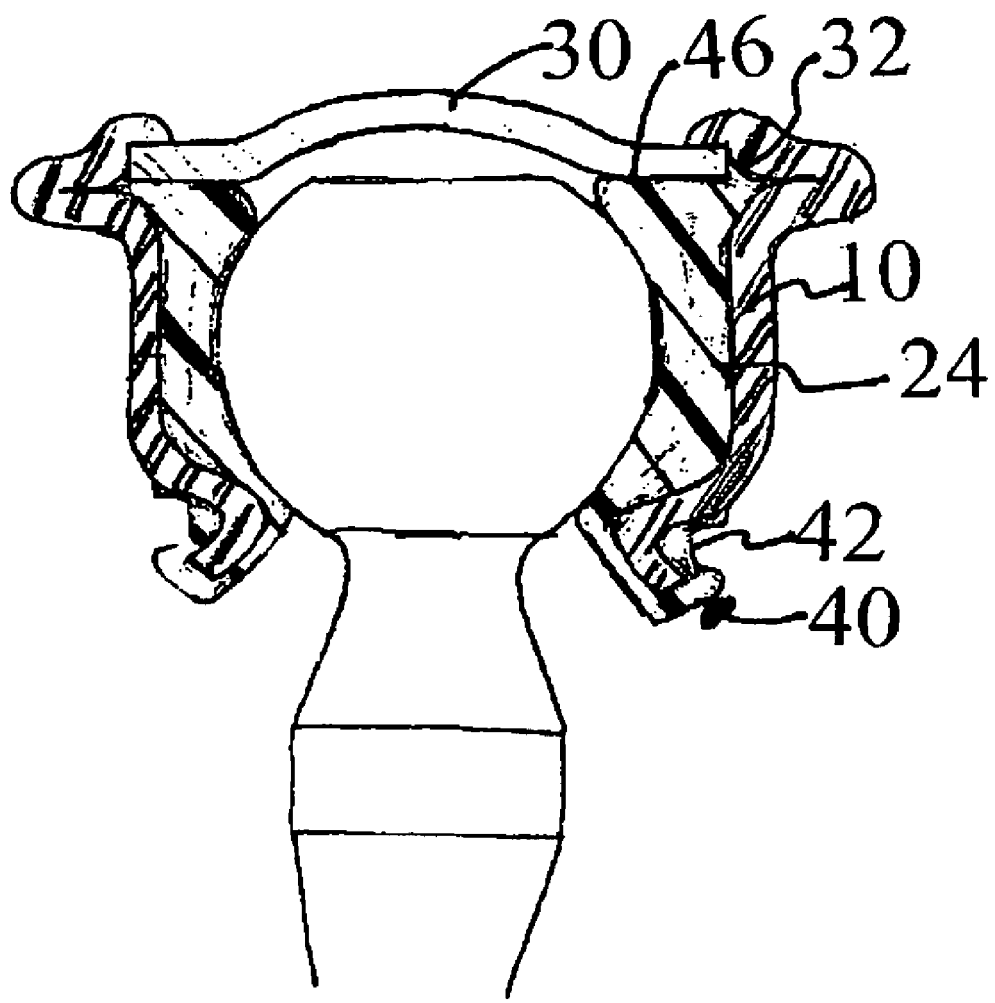
FIG. 15 is a sectional view showing an assembled ball and socket joint according to an alternative embodiment of the invention.

FIG. 15 shows an alternative design. The embodiment of FIG. 15 is formed in manner similar to the embodiment of FIG. 13. However, the molded part 40 is different form the molded part 20 of FIG. 13.

Molded part 40 includes a lower portion with the bellows seat 42. However, the race or bearing surface 24 is provided with a continuous upper and lower portion. The upper portion 46 is not segmented. With this design the ball 3 must be popped or forced into the single unsegmented molded piece 40. The end cap 30 is applied as shown in FIG. 15. The end cap 30 provides a closure and gives support to the unsegmented upper portion 46.

Figure 16:
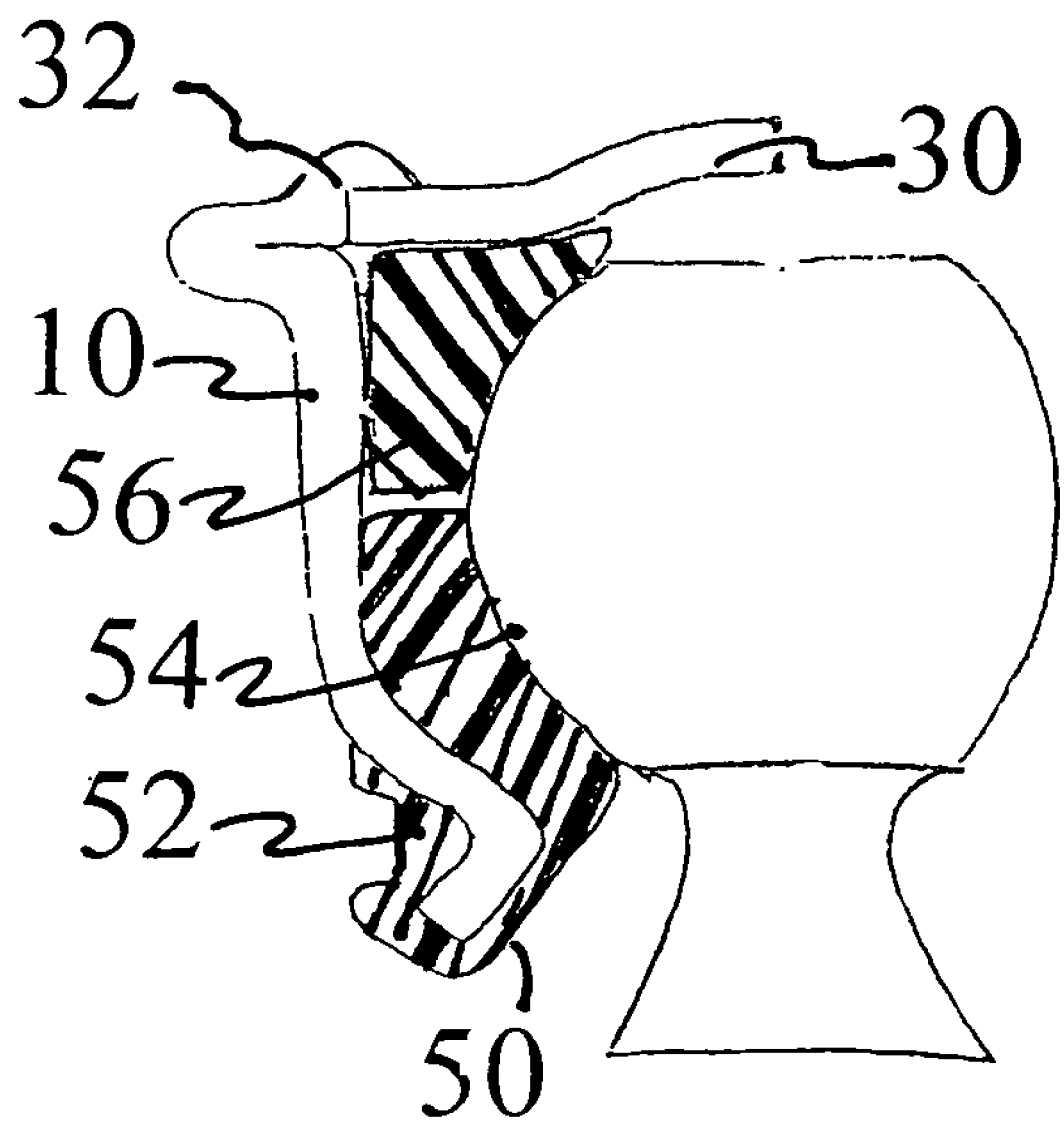
FIG. 16 is a cutaway sectional view showing an assembled ball and socket joint according to another alternative embodiment.

FIG. 16 shows still another embodiment of the ball and socket joint according to the invention. A molded part 50 is provided following a process similar to that described with reference to FIG. 7. However, the molded part 50 is provided along only a portion of the interior of housing part 10. As such, the molded part 50 forms only a lower bearing surface portion 54, forming only a portion of the overall race or interior bearing surface. Another molded race portion 56 (also made of plastic such as an injectable material) is inserted into the housing part 10 subsequent to inserting the ball pivot 1 to position ball 3 in the housing. The molded part 50 also includes the bellows seat surface 52 (the boot groove).

Figure 17B:
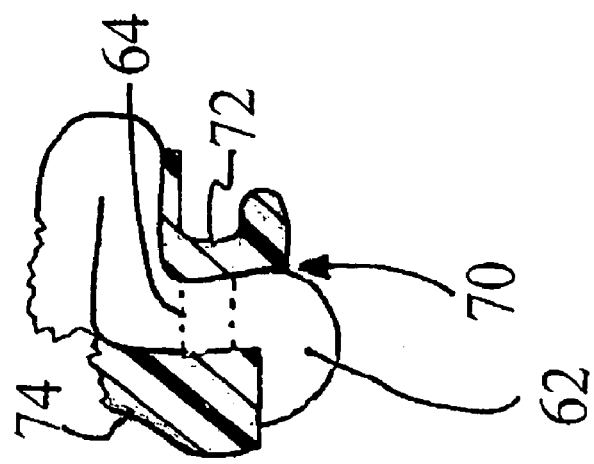
FIG. 17B is an enlarged detailed sectional view of the embodiment of FIG. 17A.
Figure 17A:
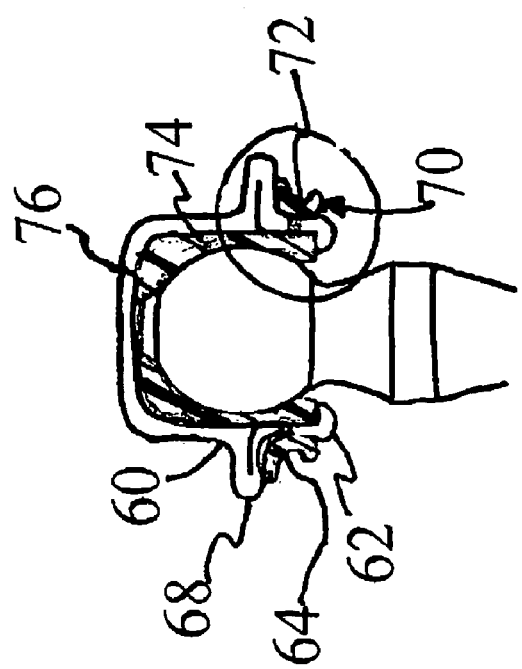
FIG. 17A is a sectional view showing an assembled ball and socket joint according to another embodiment of the invention produced by an alternate process according to the invention.

FIG. 17A shows still another embodiment of the invention. A housing part 60 is formed by a stamping procedure. The housing part 60 is a cup shaped structure with a stamped or shaped flange part 68 as well as rollover edge 62. This housing part 60 is inserted into a mold following a procedure similar to that described with reference to FIG. 7. This results in a molded part 70 which includes various functional surfaces. The functional surfaces include for example the race or bearing surface 76 in the interior of the housing 60 as well as a bellows seat (boot groove) 72. The molded part 70 is an integral structure based on passages 64 which are filled with injection molded material and form an integral structure (connected at both sides through the passages 64). The rollover edge 62 provides a retaining function and extra support to the molded part 70, supporting the race surface 76. The through holes or passages 64 are best seen in FIG. 17B. Instead of the housing part 70 being rolled over the race portion 74 (providing support for the race portion 74) a ring may also be provided. The embodiment of FIG. 17A requires a popping in of the ball 3 into the housing 60 based on the integral nature of the upper bearing portion 76 in the remainder of the bearing surface 74.

Figure 18B:
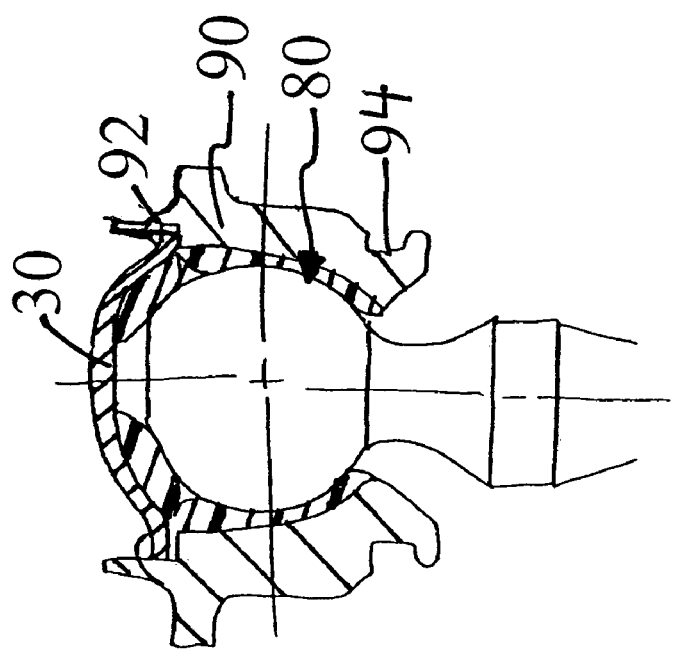
FIG. 18B is a sectional view showing an assembled ball and socket joint using the bearing shell of the embodiment FIG. 18A.
Figure 18A:
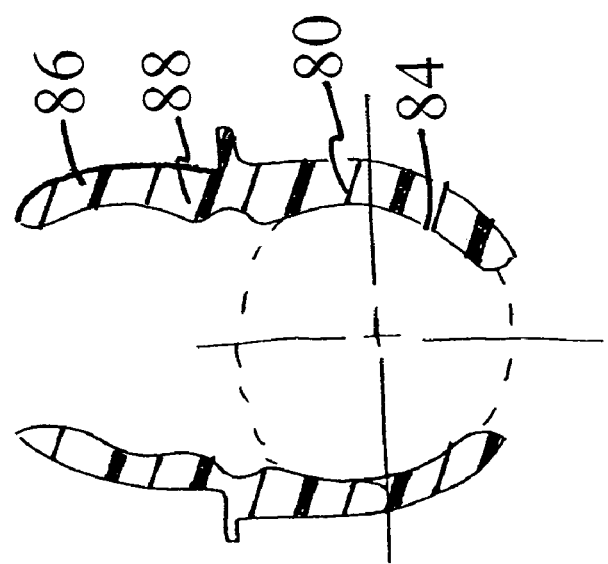
FIG. 18A is a sectional view of a one-piece bearing shell according to another embodiment of the invention.

FIG. 18A discloses an alternative embodiment in which a molded part 80 is formed as a separate molded part. The molded part 80 includes interior bearing surfaces or race surfaces 84 and also includes integral attached segments 86 attached to a remainder of the molded part 80 by folded part 88. The structure is formed as a single integral piece molded as a separate element from a housing part 90. The molded part 80 is positioned within the housing part 90. The housing part 90 may also include functional surfaces such as a bellows seat (boot groove) 94. After disposing the molded part 80 within the housing part 90, the ball 3 of the ball pivot 1 is inserted into the housing with the ball 3 in contact with the bearing surfaces 84. An end cap 30 is then applied and rollover edge 92 closes the assembly. The petals or segments 86 are positioned with an interior bearing surface in contact with an upper portion of the ball 3.

Figure 19:
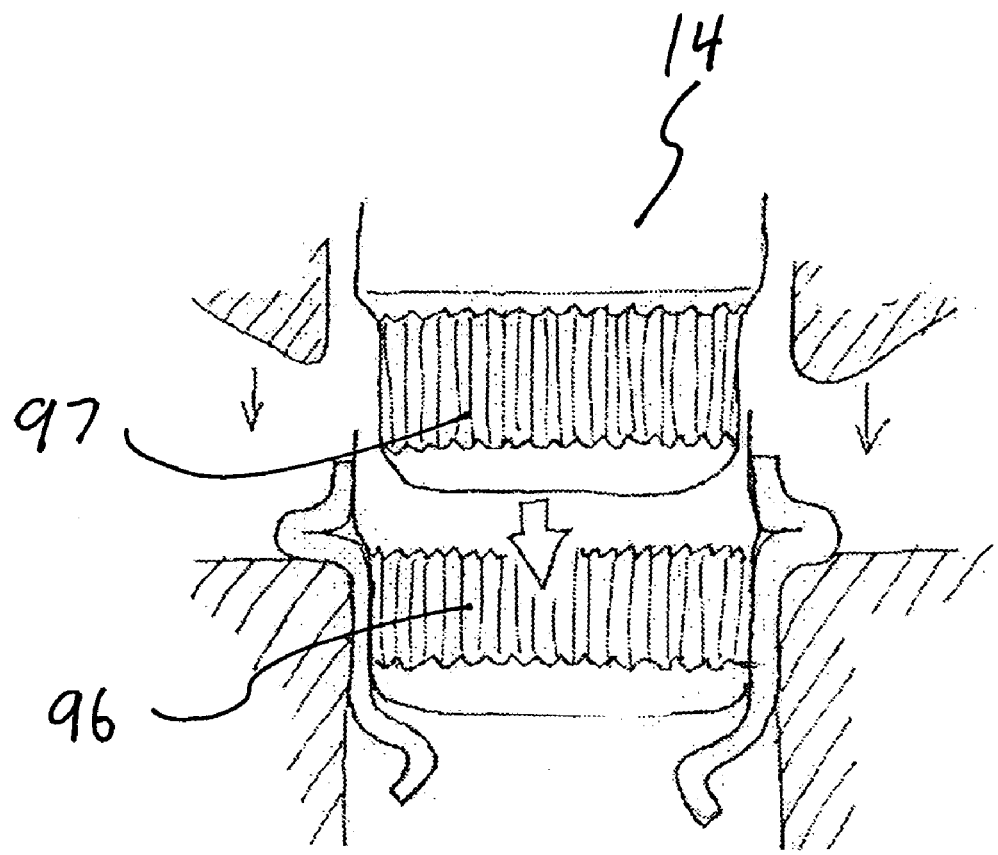
FIG. 19A is a sectional view of the housing part in a press forming step.
FIG. 19B is a sectional view of the housing part similar to that of FIG. 19A.
Figure 19:
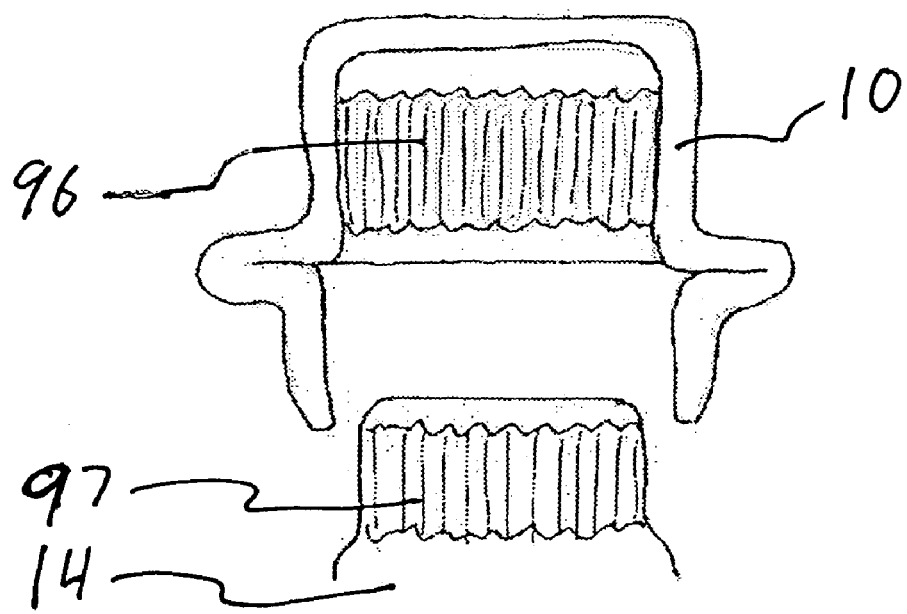

FIGS. 19A and 19B show incorporation of housing interior ribbing 96 formed on the interior surface of the housing 10. The housing interior ribbing 96 is formed as the interior support is pressed into the housing part 10 during manufacture, where interior support ribbing 97 on the interior support 14 forms the housing interior ribbing in the housing. Knurling or other surface disruption methods may also be used in place of ribbing. The housing interior ribbing is used to form an interference fit with the molded part 20 as the molded part 20 is inserted into the housing part 10. The interference fit between the parts prevents the molded part 20 from rotating relative to the housing part 10.

Figure 20:
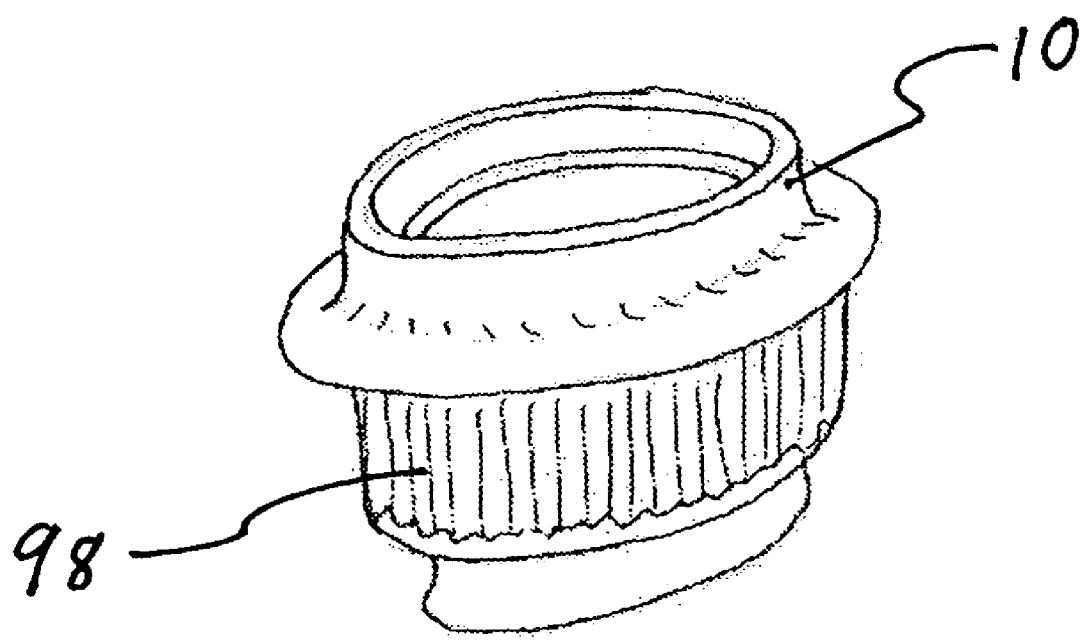
FIG. 20 is a perspective view of the housing part with outer ribbing.

FIG. 20 shows a housing part 10 with housing outer ribbing 98. The housing outer ribbing 98 is formed in a manner likewise to that used to form housing inner ribbing except that ribbing on the support 12 is used to form the housing outer ribbing 98 during pressing of the housing part 10. The housing outer ribbing is designed to provide an interference fit between the housing and a component to which it is mounted, such as that of a tie rod end in an automobile, thus preventing a rotation of the housing part 10, and therefore the aggregate joint assembly, within the component into which it is mounted. Knurling or other surface disruption methods may also be used in place of ribbing.

Figure 21:
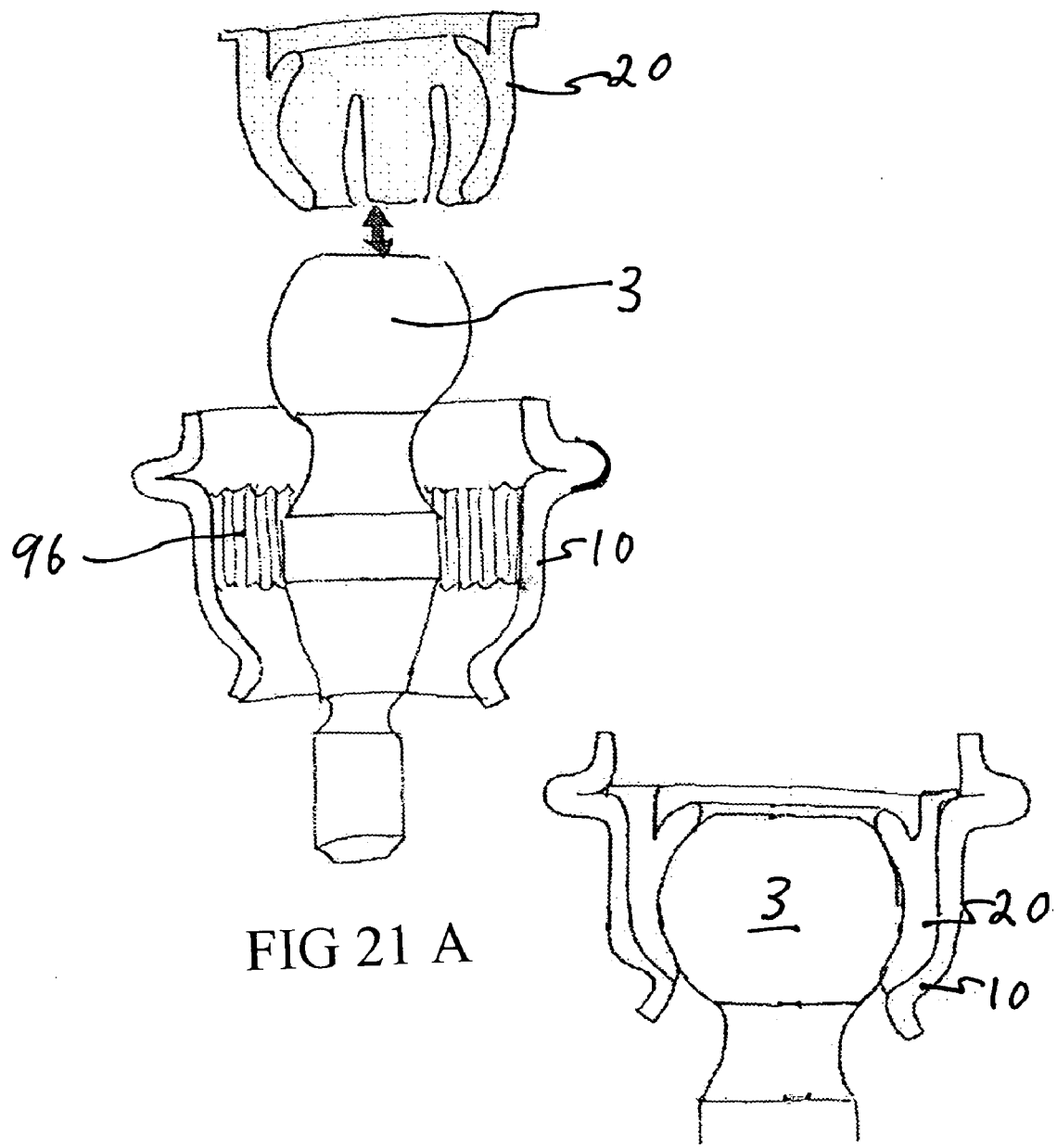
FIG. 21A is a view of a ribbed housing part prior to insertion of a molded part.
FIG. 21B is a view of the components of FIG. 21A after assembly.

FIGS. 21A & 21B show the housing part 10 with the housing interior ribbing 96 (as shown in FIGS. 19A & 19B) along with the ball 3 of the joint and the molded part 20 in both a pre assembled state (FIG. 19A) and a post assembled state (FIG. 19B) of the three components. During assembly the housing interior ribbing 96 cuts into the outer surface of the molded part 20 thus providing an interference fit.

Figure 22:
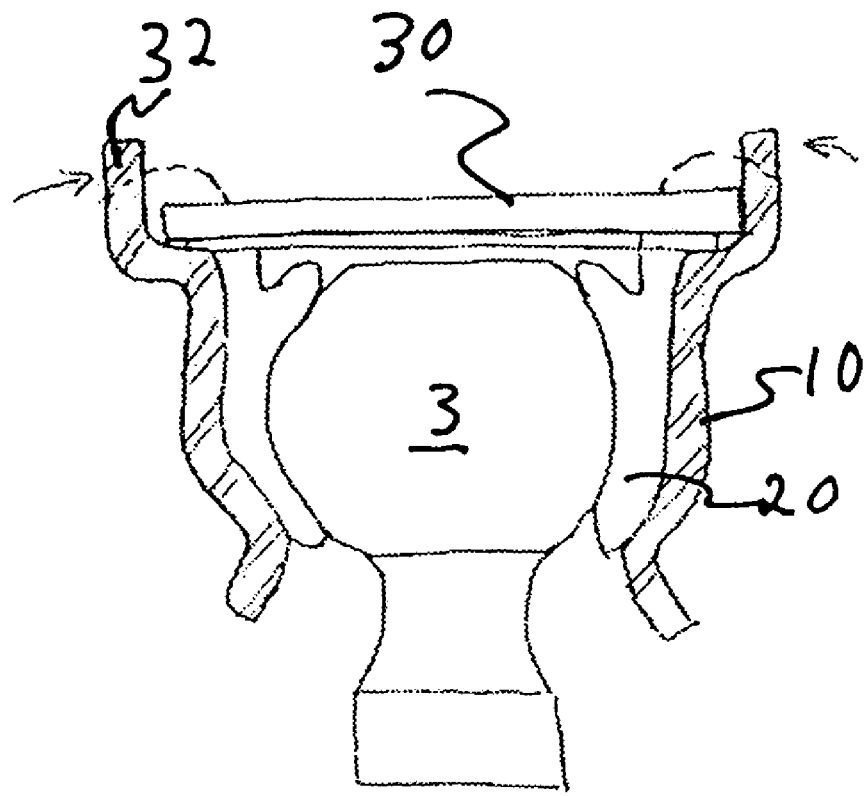
FIG. 22A is a view of the joint showing the end cap with the rolled over edge shown in dashed lines.
FIG. 22B is a sectional view of the housing part prior to folding over of an edge on the molded part.
FIG. 22C is a sectional view of the components of FIG. 22B after folding of the folding over edge.
Figure 22:
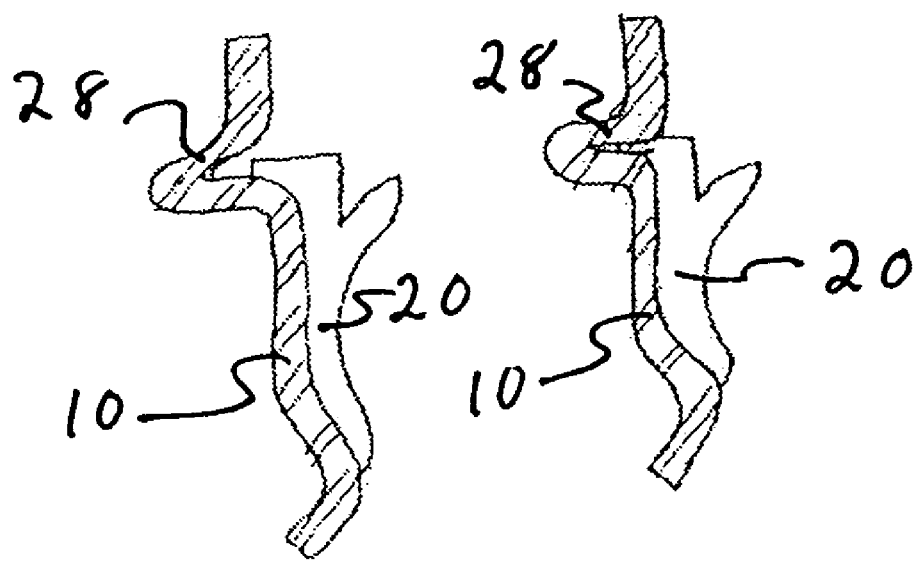

FIGS. 22A to 22C show methods of locking the molded part 20 from ejection from the housing part 10 after insertion into the housing part 10. FIG. 22A shows an end cap 30 constraining the molded part 20. The End cap 30 is then locked in place by rolling over the rollover lip 32 after placement of the end cap 30. A pre-load or force can be applied to the molded part 20 and in turn to the ball 3 by the forcing of the end cap 30 against the molded part 20 as the rollover lip 32 is rolled over. FIG. 22B shows an alternate means of holding the molded part 20 in the housing part 10. A folded area 28 protrudes to catch a lip on the molded part 20. The folded area 28 is then pressed down crimping it onto the lip of the molded part 20 thus crimping it in place as shown in FIG. 22C.

While specific embodiments of the invention have been shown and described in detail to illustrate the application of the principles of the invention, it will be understood that the invention may be embodied otherwise without departing from such principles.

APPENDIX

List of Reference Numbers:
1. Ball pivot
2. Pivot pin
3. Ball
5. Tubing
7. Shaped tubing
9. Contour
10. Housing part
11. Cut lines
12. Support
14. Interior support
15. Mold
16. Press
18. Contour
20. Molded part
22. Bellows seat 24. Bearing surface
26. Segments
28. Folded area
30. End cap
32. Rollover lip
34. Bellows
36. Ring
38. Ring
40. Molded part
42. Bellows seat
46. Upper portion
50. Molded part
52. Bellows seat surface
54. Lower bearing surface portion
56. Housing part portion
60. Housing part
62. Rollover edge
64. Passages
68. Flange part
70. Molded part
72. Bellows seat
74. Race portion
76. Race surface
80. Molded part
84. Bearing surfaces
86. Segments
88. Folded part
90. Housing part
92. Rollover edge
94. Bellows seat
96. Housing interior ribbing
97. Interior support ribbing
98. Housing outer ribbing

What is claimed is:

1. A ball-and-socket joint for motor vehicles, the ball-and-socket joint comprising:
  a joint ball and a pivot pin;
  a housing part formed of a shaped metal tube and formed with a top end edge surface defining an opening and an opposite end edge surface defining a pivot pin opening, said housing part having an outer peripheral surface at an outside of the housing part extending from said top end edge surface to said opposite end edge surface and having an inner peripheral surface at an inside of said housing part opposite said outer peripheral surface, said inner peripheral surface extending from said top end edge surface to said opposite end edge surface; and
  a molded material part comprising an integral single molded piece molded on said housing part outer peripheral surface to form an outer molded material bellows receiving functional surface on said outer peripheral surface and opposite said inner peripheral surface and molded on said inner peripheral surface to form an inner molded material functional surface on said inner peripheral surface to form at least a part of a joint ball pivot bearing surface on said inside of said housing part and opposite said outer peripheral surface, at least a part of said housing part being arranged, in a radial direction, between said outer molded material functional surface and said inner molded material functional surface.

2. A ball-and-socket joint according to claim 1, wherein said bellows receiving functional surface includes a bellows seat surface contour on an outside of said housing part.

3. A ball-and-socket joint according to claim 2, wherein said bearing shell portion forms the entire bearing shell surface in contact with substantially all of a bearing surface of said joint ball.

4. A ball-and-socket joint according to claim 3, wherein said bearing shell portion includes extension segments integral with said bearing shell portion and extending from a region of said bearing shell portion molded on said housing part, said extension segments being molded to a shape to form a joint ball end region bearing surface.

5. A ball-and-socket joint according to claim 4, further comprising an end cap wherein said housing part is formed as a shaped metal tube with the top end having an opening and said end cap closes said opening.

6. A ball-and-socket joint according to claim 2, wherein said bearing shell portion forms only a portion of said joint ball contact surface in contact with only a portion of a bearing surface of said joint ball.

7. A ball-and-socket joint according to claim 1, further comprising: a bearing shell insert inserted in said adjacent to said bearing shell portion, said bearing shell insert having a joint ball bearing surface and cooperating with said bearing shell portion for bearing contact with said joint ball.

8. A ball-and-socket joint according to claim 1, wherein said functional surfaces on each of said inside and said outside of said housing part are formed of one molded part wrapping around an edge of said housing part.

9. A ball-and-socket joint according to claim 8, wherein said functional surfaces on each of said inside and said outside of said housing part formed of one molded part wrapping around said edge of said housing part also connect to each other through one or more molded in ties integral in said molded part, said ties passing through one or more holes in said housing part.

10. A ball-and-socket joint according to claim 1, wherein said molded material of said molded material part is arranged on said housing part outer peripheral surface to form a groove surface.

11. A ball-and-socket joint according to claim 10, wherein said opposite end edge surface is covered by said molded material part, with said molded material part extending outwardly therefrom and outwardly from the adjacent outer peripheral surface and inner peripheral surface of the housing part.

12. A ball-and-socket joint in accordance with claim 1, wherein said molded material is arranged on said opposite end edge surface.

13. A ball-and-socket joint for motor vehicles, the ball-and-socket joint comprising:
  a joint ball and a pivot pin;
  a housing part formed of a shaped metal tube and formed with a top end annular surface defining an opening and an opposite end with a bottom end annular surface defining a pivot pin opening, said housing part having an outer annular peripheral surface at an outside of the housing part extending from said top end annular surface to said bottom end annular surface and having an inner peripheral surface at an inside of said housing part extending from said top end annular surface to said bottom end annular surface; and
  a molded material part comprising an integral single molded material part molded on said housing part outer peripheral surface forming a functional surface defining a bellows receiving groove and molded material molded on said housing part inner peripheral surface forming a bearing shell functional surface, said groove being in a molded material part region with said bottom end annular surface or said outer surface adjacent thereto being adjacent to or arranged in or backing at least a portion of the molded material defining the groove, at least a part of said housing part being arranged in a radial direction between said functional surface defining a groove and said bearing shell functional surface.

14. A ball-and-socket joint according to claim 13, wherein said bottom end annular surface is covered by said molded material part, with said molded material part extending outwardly therefrom and outwardly from the adjacent outer peripheral surface and inner peripheral surface of the housing part.

15. A ball-and-socket joint according to claim 14, wherein said groove is at least partially defined by a portion of said housing part adjacent to said bottom end annular surface, with said groove having a curve along an axial extent thereof.

16. A ball-and-socket joint according to claim 14, wherein said groove is annular extending around said housing part.

17. A ball-and-socket joint according to claim 13, wherein said groove is at least partially defined by a curve or bend in a portion of said housing part adjacent to said bottom end annular surface, with said groove having a curve along an axial extent thereof.

18. A ball-and-socket joint according to claim 13, wherein said housing part is covered by said molded material part molded on said inner peripheral surface to form at least a part of a joint ball pivot bearing surface on said inside of said housing part and on said housing part outer peripheral surface to form said groove.

19. A ball-and-socket joint according to claim 13, wherein said molded material of said molded material part is arranged on said inner peripheral surface to form at least a part of a joint ball bearing shell portion on said inside of said housing part and on said housing part outer peripheral surface to form said groove surface wherein said bearing shell portion includes extension segments with adjacent folded area regions integral with said bearing shell portion and extending from a region of said bearing shell portion molded on said housing part, said extension segments being molded to a shape to form a joint ball end region bearing surface.

20. A ball-and-socket joint for motor vehicles, the ball-and-socket joint comprising:
a joint ball and a pivot pin;
a housing part formed of a shaped metal tube and formed with a top end edge surface with a top opening and an opposite end with a pivot pin opening having a pivot pin opening edge surface, said housing part having an outer surface at an outside of the housing part extending from said top end edge surface to said pivot pin opening edge surface and having an inner surface at an inside of said housing part extending from said top end edge to said pivot pin opening edge surface; and
a molded material part comprising an integral single piece molded on said housing part inner surface to form at least a part of a joint ball pivot bearing shell portion on said inside of said housing part and said molded material molded on said housing part outer surface to form a groove directed outwardly and opposite said housing part inner surface, said groove being defined by a bent or curved portion of said housing part, adjacent to said pivot pin opening edge surface, cooperating with said molded material on said housing part outer surface with at least a part of said housing part being arranged in a radial direction between said groove and said molded material covering said housing part inner surface.

21. A ball-and-socket joint according to claim 20, further comprising a bellows seal, wherein said groove is a bellows seat surface contour on an outside of said housing part, said bellows seal having a portion seated in said bellows seat surface contour.

22. A ball-and-socket joint according to claim 20, wherein said molded material of said molded material part is arranged on said inner surface to form said joint ball bearing shell portion on said inside of said housing part wherein said bearing shell portion includes extension segments with adjacent folded area regions integral with said bearing shell portion and extending from a region of said bearing shell portion molded on said housing part, said extension segments being molded to a shape to form a joint ball end region bearing surface wherein said bearing shell portion and said joint ball end region bearing surface forms the entire bearing shell.

23. A ball-and-socket joint according to claim 20, wherein said bearing shell portion forms only a portion of a joint ball contact surface in contact with a bearing surface of said joint ball.

24. A ball-and-socket joint according to claim 20, further comprising an end cap connected to said housing part at said top end edge surface, said end cap closing said top opening.

25. A ball-and-socket joint according to claim 20, wherein, said groove is annular extending around said housing part.

26. A ball-and-socket joint according to claim 20, wherein said molded material part wraps around said pivot pin opening edge surface of said housing part.

27. A ball-and-socket joint according to claim 26, wherein said functional surfaces on each of said inside and said outside of said housing part formed of one molded part wrapping around said edge surface of said housing part also connect to each other through one or more molded in ties integral in said molded part, said ties passing through one or more holes in said housing part.

* * * * *